United States Patent Office 3,142,694
Patented July 28, 1964

3,142,694
THIOCARBAMIC ESTERS
Jean Metivier, Arpajon, France, assignor to Societe des Usines Chimiques Rhone-Poulenc, Paris, France, a French body corporate
No Drawing. Filed Dec. 14, 1961, Ser. No. 159,453
Claims priority, application France Dec. 20, 1960
6 Claims. (Cl. 260—455)

This invention relates to new thiocarbamic esters, to a process for their preparation and fungicidal compositions containing them.

According to the present invention, there are provided new thiocarbamic esters of the general formula:

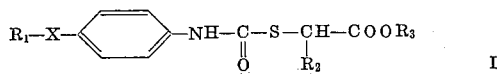

wherein X represents an oxygen or sulphur atom, $R_1$ represents a lower alkyl or lower alkenyl group, $R_2$ represents a hydrogen atom or a methyl group, $R_3$ represents a lower alkyl, lower hydroxyalkyl or lower alkoxyalkyl group, and the benzene ring may, in addition to the groups para with respect to each other, be substituted by one or more members of the class consisting of halogen atoms, lower alkyl, lower alkoxy, lower alkenyloxy, lower alkylthio, lower alkoxycarbonyl, lower alkanesulphonyl, nitro and trifluoromethyl groups. Preferred additional substituents on the benzene ring are halogen atoms. By the word "lower" as applied in this specification and in the appended claims to an organic group is meant that the group in question contains not more than four carbon atoms.

Those compounds of general Formula I where $R_2$ represents a methyl group can exist in optically active forms as the carbon atom to which the group is attached is an asymmetric carbon atom. The invention includes within its scope the racemates as well as the corresponding optically active isomers of such compounds.

According to a feature of the invention, these new esters are obtained by reacting a phenylisocyanate of the general formula:

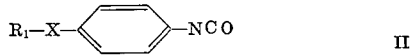

(wherein X and $R_1$ are as hereinbefore defined, and the benzene ring may, in addition to the groups para with respect to each other, be substituted by one or more members of the class consisting of halogen atoms, lower alkyl, lower alkoxy, lower alkenyloxy, lower alkylthio, lower alkoxycarbonyl, lower alkanesulphonyl, nitro and trifluoromethyl groups) with an ester of the formula:

wherein $R_2$ and $R_3$ are as hereinbefore defined. The reaction is preferably carried out in an inert organic solvent medium, preferably an aromatic hydrocarbon such as benzene, and at a temperature between 15° and 150° C.

In the case of esters of Formula I where $R_2$ represents a methyl group, optically active isomers may be obtained by using optically active starting materials of Formula III in the aforesaid process, or by resolution in manner known per se of racemic products.

The new thiocarbamic esters of general formula I have useful fungicidal properties; in particular they are active against potato blight, French bean anthracnose, and apple- and pear-scab. Compounds of importance are those in which $R_3$ represents a lower alkyl group and especially ethyl 2-(4-ethoxyphenylcarbamoylthio)acetate, ethyl 2-(4-methoxyphenylcarbamoylthio)acetate, ethyl 2-(4-methoxyphenylcarbamoylthio)propionate and ethyl 2-(3-chloro-4-methoxyphenylcarbamoylthio)-acetate.

According to a further feature of the present invention, there are provided fungicidal compositions containing at least one thiocarbamic ester of general formula I in association with one or more diluents compatible with the thiocarbamic ester or esters and suitable for use in agricultural fungicidal compositions. Preferably the compositions contain between 0.005 and 50% by weight of thiocarbamic ester. The compositions may be solid if there is employed a powdered solid compatible diluent such as talc, calcined magnesia, kieselguhr, tricalcium phosphate, powdered cork, absorbent carbon black or a clay such as kaolin or bentonite. Instead of a solid diluent, there may be used a liquid in which the thiocarbamic ester is dissolved or dispersed. The compositions may thus take the form of aerosols, suspensions, emulsions or solutions in water, organic or aqueous organic media, for example aromatic hydrocarbons such as toluene or xylene or mineral, animal or vegetable oils, or mixtures of these diluents. The compositions in the form of dispersions, solutions or emulsions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When desired, the emulsions of the thiocarbamic esters may be prepared in the form of self-emulsifying concentrates containing the active substance dissolved in the dispersing agent or in a solvent containing a dispersing agent compatible with the active ester and solvent, a simple addition of water producing compositions ready for use.

The solid compositions are preferably prepared by grinding the thiocarbamic ester with the solid diluent, or by impregnating the solid diluent with a solution of the thiocarbamic ester in a volatile solvent, evaporating the solvent, and, if necessary grinding the product so as to obtain a powder.

Fertilisers may be admixed with the aforesaid compositions.

For fungicidal purposes the active substances may be employed in dosages varying within relatively wide limits but dosages corresponding to a quantity of from 100 to 300 g. of active substance per hectare are generally suitable.

The following examples illustrate the invention.

*Example I*

Ethyl thioglycolate (36.6 g.) is added to a solution of 4-ethoxyphenylisocyanate (48.9 g.) in benzene (100 cc.) and heated under reflux for 9 hours. The reaction medium is taken up in cyclohexane (200 cc.) and the solid obtained filtered off. Ethyl 2-(4-ethoxyphenylcarbamoylthio)acetate (60 g.), M.P. 90° C., is obtained after recrystallisation from cyclohexane.

*Example II*

Ethyl thioglycolate (24.6 g.) and triethylamine (0.5 cc.) are added to a solution of 4-methoxyphenylisocyanate (29.8 g.) in benzene (100 cc.), the temperature being kept below 60° C. The reaction mixture is concentrated under reduced pressure and the solid obtained is recrystallised from a mixture of benzene and cyclohexane. After drying, ethyl 2-(4-methoxyphenylcarbamoylthio)acetate (48 g.), M.P. 68° C., is obtained.

*Example III*

Proceeding as in Example II but replacing the ethyl thioglycolate (24.6 g.) by ethyl thiolactate (27.3 g.), ethyl 2 - (4 - methoxyphenylcarbamoylthio)propionate (40 g.), M.P. 60° C., is obtained after crystallisation from cyclohexane.

*Example IV*

Ethyl thioglycolate (24.6 g.) and triethylamine (0.5 cc.) are added to a solution of 3-chloro-4-methoxyphenylisocyanate (36.6 g.) in benzene (100 cc.) without allowing the temperature of the reaction mixture to exceed 40° C. The precipitate which forms is recrystallised from ethanol, giving ethyl 2-(3-chloro-4-methoxyphenylcarbamoylthio)acetate (35.5 g.), M.P. 99° C.

*Example V*

A condensation product of octylphenol (1 mole) and ethylene oxide (10 moles) (10 g.) is added to a solution of ethyl 2 - (4 - methoxyphenylcarbamoylthio)acetate (20 g.) is isophorone (90 cc.). After suspending in water, the emulsion obtained may be used against fungal parasites of plants.

*Example VI*

A mixture of ethyl 2-(4-ethoxyphenylcarbamoylthio)-acetate (40 g.), talc (50 g.) and calcium lignosulphite (10 g.) is ground finely, giving a mixture which may be used, after suspension in water, against fungal parasites of plants.

I claim:

1. A thiocarbamic ester of the formula:

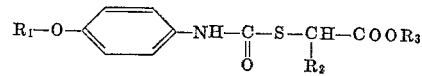

wherein $R_1$ and $R_3$ represent lower alkyl groups and $R_2$ represents a member of the class consisting of a hydrogen atom and a methyl group.

2. A thiocarbamic ester as claimed in claim 1 wherein the benzene ring carries at least one chlorine atom.

3. Ethyl 2-(4-ethoxyphenylcarbamoylthio)acetate.
4. Ethyl 2-(4-methoxyphenylcarbamoylthio)acetate.
5. Ethyl 2-(4-methoxyphenylcarbamoylthio)propionate.
6. Ethyl 2-(3-chloro-4-methoxyphenylcarbamoylthio) acetate.

References Cited in the file of this patent

UNITED STATES PATENTS

| | | |
|---|---|---|
| 2,786,795 | Ligett et al. | Mar. 26, 1957 |
| 2,844,506 | Jenkins | July 22, 1958 |
| 2,910,497 | Meuly | Oct. 27, 1959 |
| 2,910,498 | Meuly | Oct. 27, 1959 |